(12) United States Patent
Chang et al.

(10) Patent No.: US 9,664,865 B2
(45) Date of Patent: May 30, 2017

(54) OPTICAL FIBER CONNECTOR ASSEMBLY

(71) Applicant: SENKO ADVANCED COMPONENTS, INC., Marlborough, MA (US)

(72) Inventors: Jimmy Jun-Fu Chang, Worcester, MA (US); Paul Newbury, Ashland, MA (US)

(73) Assignee: Senko Advanced Components, Inc., Marlborough, MA (US)

(*) Notice: Subject to any disclaimer, the term of this patent is extended or adjusted under 35 U.S.C. 154(b) by 0 days.

(21) Appl. No.: 15/068,986

(22) Filed: Mar. 14, 2016

(65) Prior Publication Data

US 2016/0291262 A1    Oct. 6, 2016

Related U.S. Application Data

(63) Continuation of application No. 14/256,620, filed on Apr. 18, 2014, now Pat. No. 9,297,964.

(51) Int. Cl.
*G02B 6/36* (2006.01)
*G02B 6/38* (2006.01)

(52) U.S. Cl.
CPC ......... *G02B 6/3887* (2013.01); *G02B 6/3857* (2013.01); *G02B 6/3879* (2013.01)

(58) Field of Classification Search
CPC ............................ G02B 6/3857; G02B 6/3879
See application file for complete search history.

(56) References Cited

U.S. PATENT DOCUMENTS

| | | | | |
|---|---|---|---|---|
| RE31,515 E | * | 2/1984 | Heldt | G02B 6/3835 385/78 |
| 5,058,984 A | * | 10/1991 | Bulman | G02B 6/3887 385/80 |
| 5,806,175 A | * | 9/1998 | Underwood | G02B 6/3887 29/748 |
| 7,011,454 B2 | * | 3/2006 | Caveney | G02B 6/3806 385/59 |
| 7,572,065 B2 | * | 8/2009 | Lu | G02B 6/3816 385/55 |
| 8,764,316 B1 | * | 7/2014 | Barnette | G02B 6/3869 385/76 |
| 9,297,964 B2 | * | 3/2016 | Chang | G02B 6/3887 |
| 2005/0036744 A1 | * | 2/2005 | Caveney | G02B 6/3806 385/87 |
| 2008/0175541 A1 | * | 7/2008 | Lu | G02B 6/3816 385/62 |
| 2012/0063723 A1 | * | 3/2012 | Jenkins | G02B 6/3816 385/78 |
| 2015/0301294 A1 | * | 10/2015 | Chang | G02B 6/3887 385/87 |
| 2016/0291262 A1 | * | 10/2016 | Chang | G02B 6/3887 |

* cited by examiner

*Primary Examiner* — Rhonda Peace
(74) *Attorney, Agent, or Firm* — Pepper Hamilton LLP

(57) ABSTRACT

A crimp connector is disclosed for enhancing pull-retention of a fiber optic cable in a fiber optic connector assembly housing. The connector has a flange for engaging with the housing and crimp member for engaging with the cable.

18 Claims, 6 Drawing Sheets

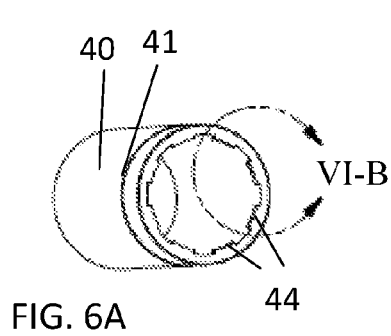
FIG. 6A
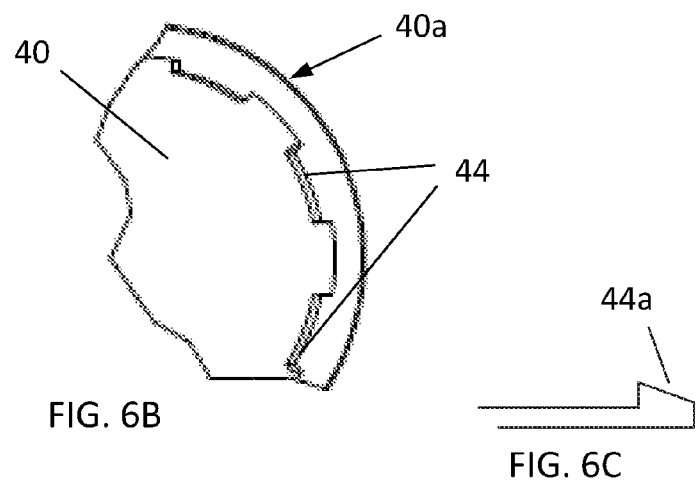
FIG. 6B
FIG. 6C
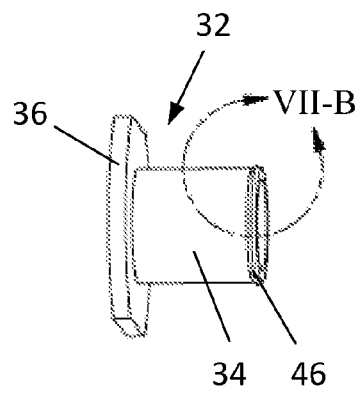
FIG. 7A
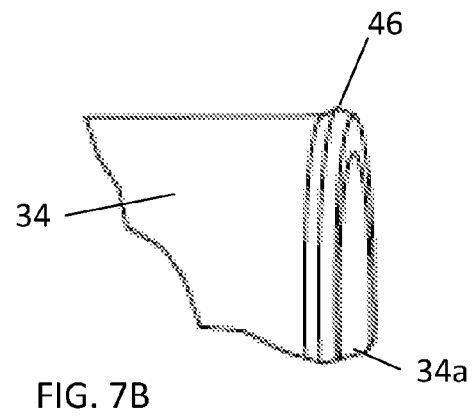
FIG. 7B
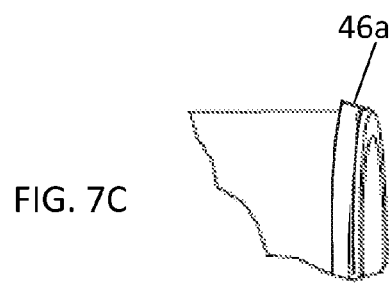
FIG. 7C

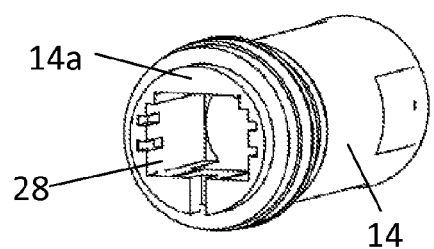
FIG. 8A
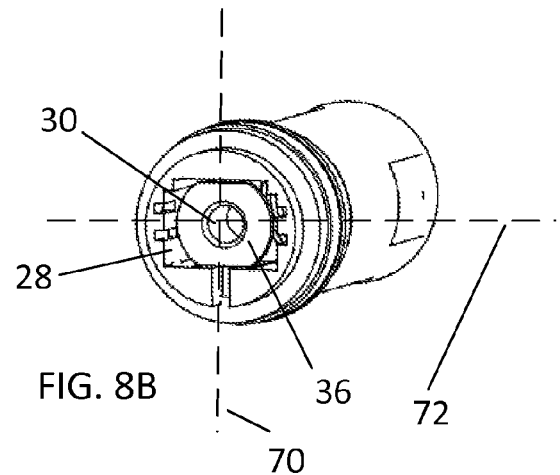
FIG. 8B
FIG. 9A
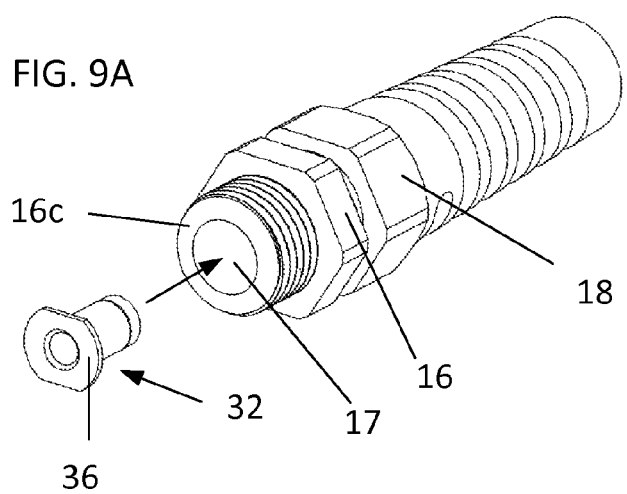
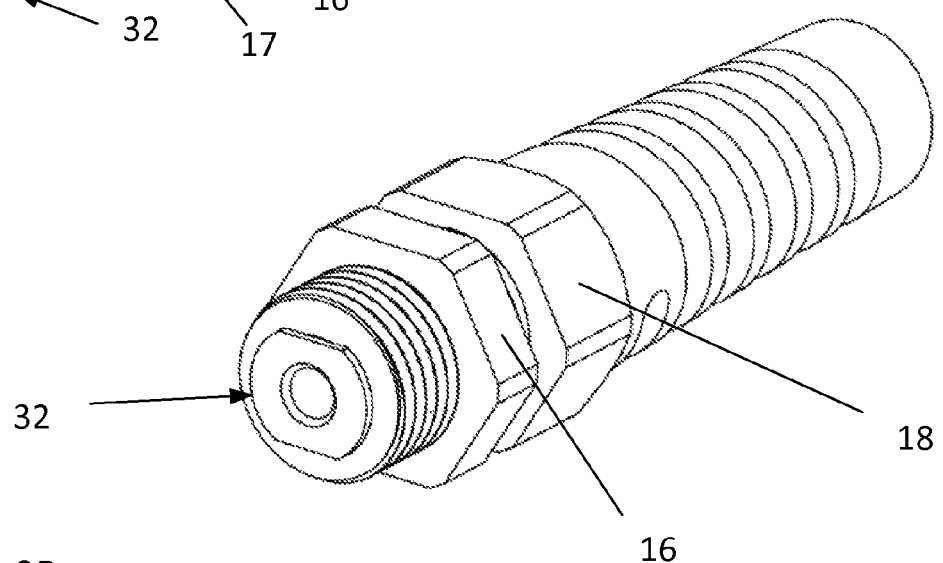
FIG. 9B

OPTICAL FIBER CONNECTOR ASSEMBLY

CROSS REFERENCE TO RELATED APPLICATIONS

This application is a continuation of U.S. patent application Ser. No. 14/256,620 filed Apr. 18, 2014, which is incorporated herein by reference in its entirety.

BACKGROUND

The use of fiber optics for communications purposes continues to grow. Data, voice, and other communication networks are increasingly using fiber optics to carry information. In a fiber optic network, each individual fiber is generally connected to both a source and a destination device. Additionally, along the fiber optic run between the source and the destination, various connections or couplings may be made on the optical fiber to adjust the length of the fiber or to provide termination connection ports for end users at which one or more fibers may be branched from a feed cable. Each connection or coupling requires a connector and adaptor to align the fibers such that the light can transmit without interruption, and in instances when the connection may be exposed to weather conditions, an essentially waterproof configuration of components.

To interconnect the cables, numerous, different, cable connector designs and are available. Some example connectors may include, but are not limited to, SC, LC, ST and MPO connectors. In most of these designs, a pair of ferrules (one in each connector, or one in the connector and one in the apparatus or device), each containing an optical fiber end, are butted together end to end and light travels across the junction. To function effectively, an optical connector should join optical fibers with a minimum of insertion loss, and should provide mechanical stability and protection to the junction between the fibers in the operating environment. In general, the stability and protection of the fiber junction may be determined by the connector design.

Standard connector designs however, may not provide a means for a weather tight seal or similar environmental protection, and if used in a location where access is not protected, cables may be jostled or pulled, and possibly become loose or completely disengaged from their connector assemblies. Standard connectors may therefore not be rugged enough for use in extreme environments or locations where the cable connections is not well protected. Therefore, there remains a need for a ruggedized, connector assembly that is easy to install while also meeting the necessary performance requirements.

SUMMARY

In order to enhance pull-retention of a fiber optic cable in a fiber optic connector assembly housing a cable retention member may be provided within the assembly to engage the cable with the housing.

In an embodiment, an optical fiber cable connector includes a connector housing. The connector housing has a first end and a second end spaced longitudinally from the first end, and the housing defines an internal chamber extending between the first end and the second end, the chamber having at least one first cross-sectional dimension, and the second end having a cable passage for receiving an optical fiber cable therethrough for entry of the optical fiber cable into the internal chamber. The cable passage defines at least one second cross-sectional dimension, the second cross-sectional dimension being less than the first cross-sectional dimension to define an internal shoulder disposed radially about at least a portion of the cable passage. The optical fiber cable connector also includes at least one optical fiber connector disposed within the first end of the connector housing and connected to at least one optical fiber of the optical fiber cable, and a cable retention element disposed within the internal chamber about the optical fiber cable. The cable retention element includes a retention member, and the retention member includes a cylindrical portion disposed about at least a portion of the optical fiber cable, the cylindrical portion having a first end and a second end spaced from the first end, with the at least one optical fiber extending through the cylindrical portion from the first end through the second end, and a radial flange extending radially from the cylindrical portion adjacent the second end of the cylindrical portion, the radial flange defining a third cross-sectional dimension less than or equal to the first cross-sectional dimension and greater than the second cross-sectional dimension for engaging the shoulder of the cable passage and preventing entry of the radial flange into the cable passage. The cable retention element also includes a crimp tube having a first end disposed about and crimped to the optical fiber cable, and a second end spaced from the first end and disposed about and crimped to the cylindrical portion of the first retention member to retain the first retention member with the optical fiber cable.

In an embodiment, a cable retention element for retaining an optical fiber cable with a fiber optic cable connector includes a first retention member and a crimp tube. The first retention member includes a cylindrical portion for being disposed about at least a portion of an optical fiber cable, the cylindrical portion having a first end, a second end spaced from the first end, and a central passage extending from the first end to the second end. The retention member also includes a radial flange extending radially outwardly from the cylindrical portion adjacent the second end of the cylindrical portion, the radial flange being configured for engaging with a portion of a fiber optic cable connector. The crimp tube has a first end for being disposed about and crimped to the optical fiber cable, and a second end spaced from the first end for being disposed about and crimped to at least the first end of the cylindrical portion of the first retention member to retain the first retention member with the optical fiber cable.

In an embodiment, a method is disclosed for retaining a fiber optic cable with an optical fiber cable connector. The fiber optic cable includes at least one protective layer disposed about at least one optical fiber. The method includes inserting the optical fiber cable through a first end of connector housing and through an internal chamber of the connector housing, wherein the connector housing has a second end spaced longitudinally from the first end with the internal chamber extending between the first end and the second end, the first end including a cable passage for receiving the fiber optic cable therethrough, the cable passage having a first cross-sectional dimension, and the first end defines an internal shoulder within the internal chamber and disposed radially about at least a portion of the cable passage. The method also includes removing a portion of the at least one protective layer of the optical fiber cable to expose a length of the at least one optical fiber, and provide a protective layer end about the at least one optical fiber, and installing a crimp tube about the fiber optic cable, the crimp tube having a first end and a second end spaced from the first end, the first end including at least one radially inwardly extending tooth for engaging into the at least one protective layer of the optical fiber cable. The method also includes inserting the at least one optical fiber through a cable retention member to at least abut a first end of the cable retention member with the protective layer end, wherein the cable retention member includes a cylindrical portion defining the first end, and having a second end spaced from the first end, the cylindrical portion defining a first diameter, and the first end comprising at least one radially outwardly extending annular ring defining a second diameter greater than the first diameter, and the cable retention member also includes a radial flange extending radially from the cylindrical portion adjacent the second end of the cylindrical portion, the radial flange defining a second cross-sectional dimension greater than the first cross-sectional dimension for engaging with the internal shoulder about the cable passage and preventing entry of the radial flange into the cable passage. The method also includes disposing the second end of the crimp tube about the cylindrical portion of the retention member, crimping the second end of the crimp tube about the cylindrical portion of the retention member to reduce an internal diameter of second end of the crimp tube to a diameter less than the second diameter defined by the annular ring, crimping the first end of the crimp tube about the fiber optic cable to engage the at least one tooth into the at least one protective layer, installing at least one optical fiber connector onto the at least one optical fiber, and pulling the optical fiber cable back through the connector housing to abut the radial flange with the internal shoulder wherein abutment of the radial flange with the internal shoulder retains the fiber optic cable with the optical fiber cable connector.

BRIEF DESCRIPTION OF THE FIGURES

FIGS. 6A-6C depict an end view of a crimp ring according to an embodiment.

FIGS. 7A-7C depict a side view of a retention post according to an embodiment.

FIGS. 8A and 8B show perspective views of a cable retention device in relation to a terminal housing portion according to an embodiment.

FIGS. 9A and 9B depict a configuration of a connector with a cable retention device according to an embodiment.

DETAILED DESCRIPTION

It is to be understood that the drawings are solely for purpose of illustration and do not define any limits of the embodiments. Furthermore, the components in the figures are not necessarily to scale, emphasis instead being placed upon illustrating the principles of the invention. For simplification, many of the drawings do not include a depiction of a fiber-optic cable as it would be disposed therein.

Figure 1:
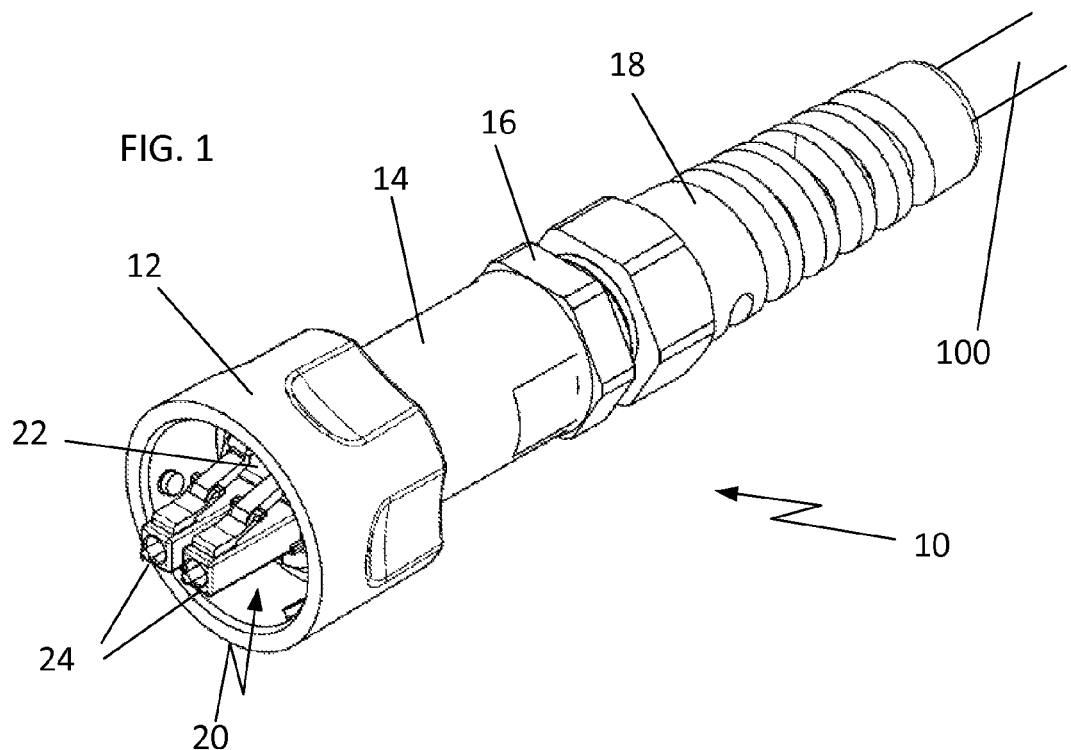
FIG. 1 depicts a perspective view of a dual LC optical fiber connector according to an embodiment.
Figure 2A:
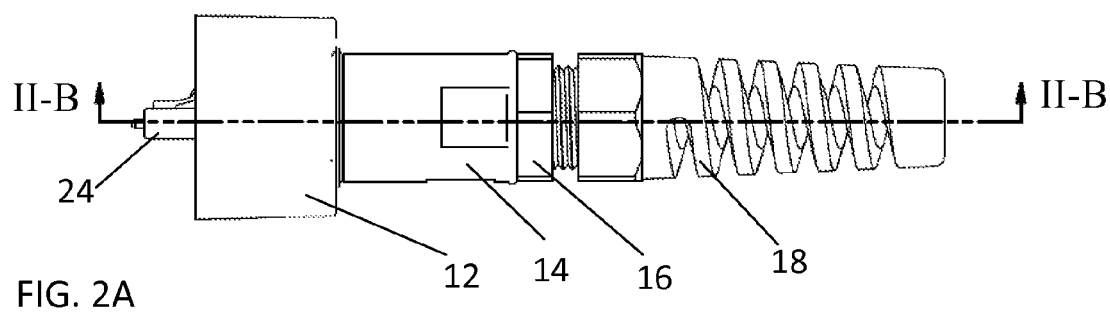
FIG. 2A provides a side view of the connector of FIG. 1 according to an embodiment.
Figure 2B:
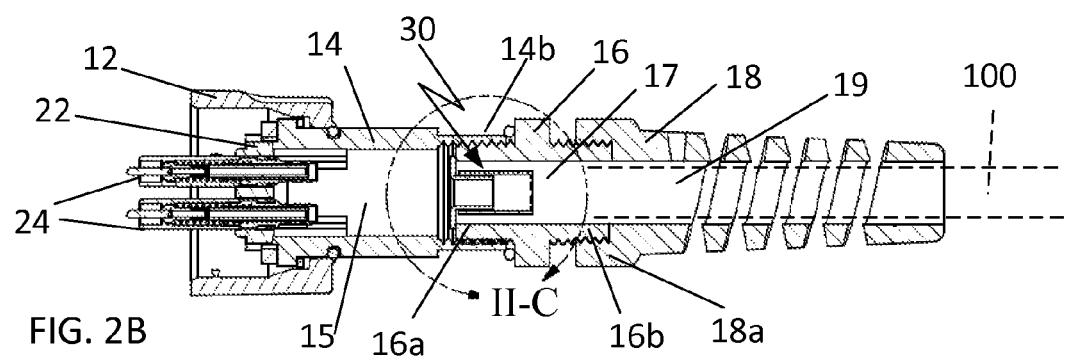
FIG. 2B provides a cross-sectional view of the connector of FIG. 2A according to an embodiment.

FIGS. 1, 2A and 2B depict views of a fiber optic connector assembly 10. While the depicted fiber optic connector 10 is of a dual LC type connector, any description and drawings presented herein are also applicable to other types of fiber optic connectors, such as, for example, MPO, MT-RJ, APC (Angled Polished Connector), SC, SC APC, FC, FC APC, ST, LC APC, dual or simplex, with multi-mode or single-mode fibers. The connector assembly 10 features push-pull insertion and a bayonet-style mechanical latch 12 to connect the assembly to a terminal device or another cable.

Figure 4:
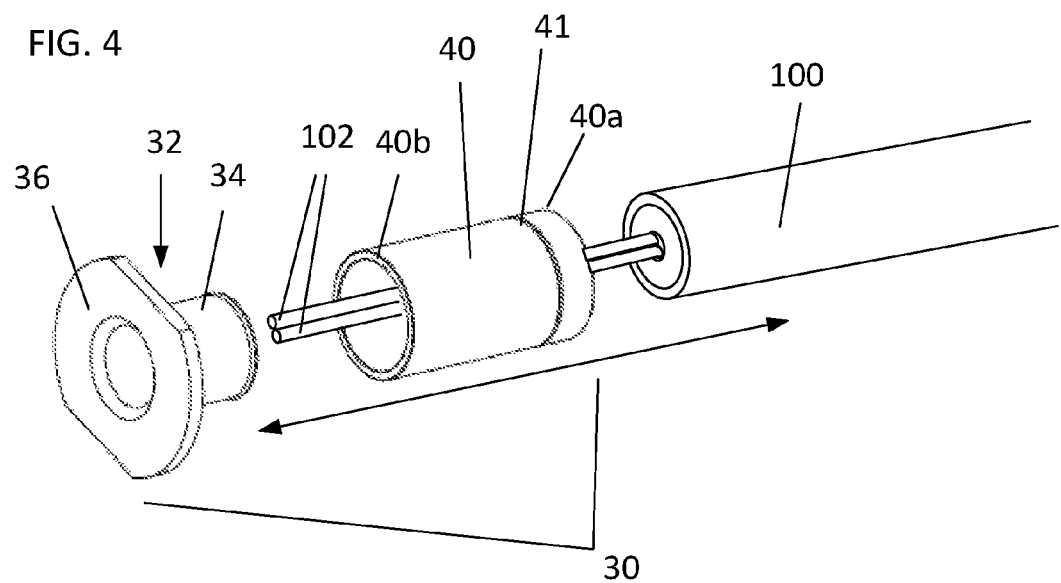
FIG. 4 depicts an installation of a cable retention device on a dual fiber optic cable according to an embodiment.

The connector 10 may include a housing component 14, a tailpiece of a sealing fitting 16 and a flexible boot 18, and an optical connector sub-assembly 20. The housing component 14 may define an internal chamber 15 configured for receiving at least one optical fiber (such as fibers 102 in FIGS. 4, 5) therethrough. The optical connector sub-assembly 20 may seat within the housing 14, and may include an adapter clip 22 and a pair of optical connectors 24 mounted side-by-side within the clip. The optical connectors 24 may terminate optical fibers (for example, fibers 102 such as are depicted in FIG. 4) of a fiber optic cable 100 and may be any suitable type of connector for providing this function.

Figure 5:
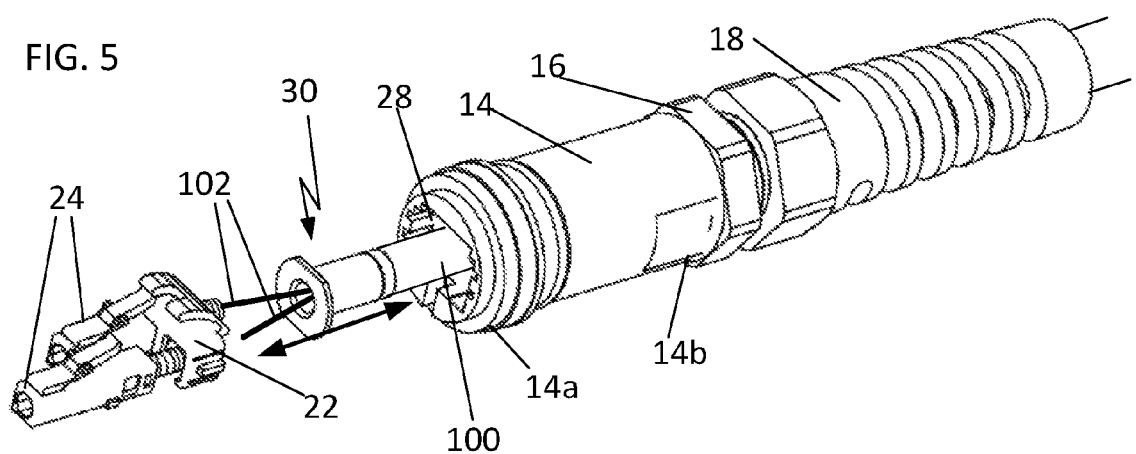
FIG. 5 depicts a partially exploded view of cable connector assembly according to an embodiment.

As represented in more detail in FIG. 5, the terminal optical connectors 24 may be slidably insertable into the clip 22, and the clip may be slidably insertable into an opening 28 in a first end 14a of the housing 14. At least one of the housing 14 and clip 22 may be configured with a releasable catch configured for retaining the clip within the housing. A second end 14b of the housing 14 may be configured for attachably receiving the fitting 16. In an embodiment as shown in FIG. 2B, the fitting 16 may include a first end 16a that is threaded to engage with a threaded portion of the housing end 14b. A second end 16b of the fitting 16 may be configured for attachably receiving the boot 18. In an embodiment as shown, the second end 16b may be internally threaded to engage with an externally threaded portion of a first end 18a of the boot 18. The fitting 16 may define a cable passage 17 extending through the fitting from the first end 16a to the second end 16b. The boot 18 may include a cable passage 19 for passage of a cable 100 therethrough.

Figure 2C:
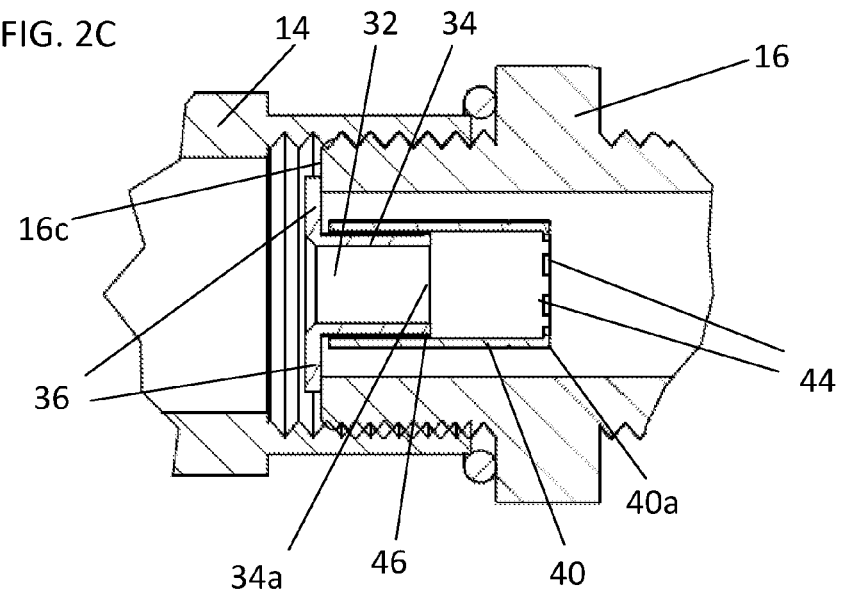
FIG. 2C depicts a detail of a cable retention device shown in FIG. 2B according to an embodiment.
Figure 3:
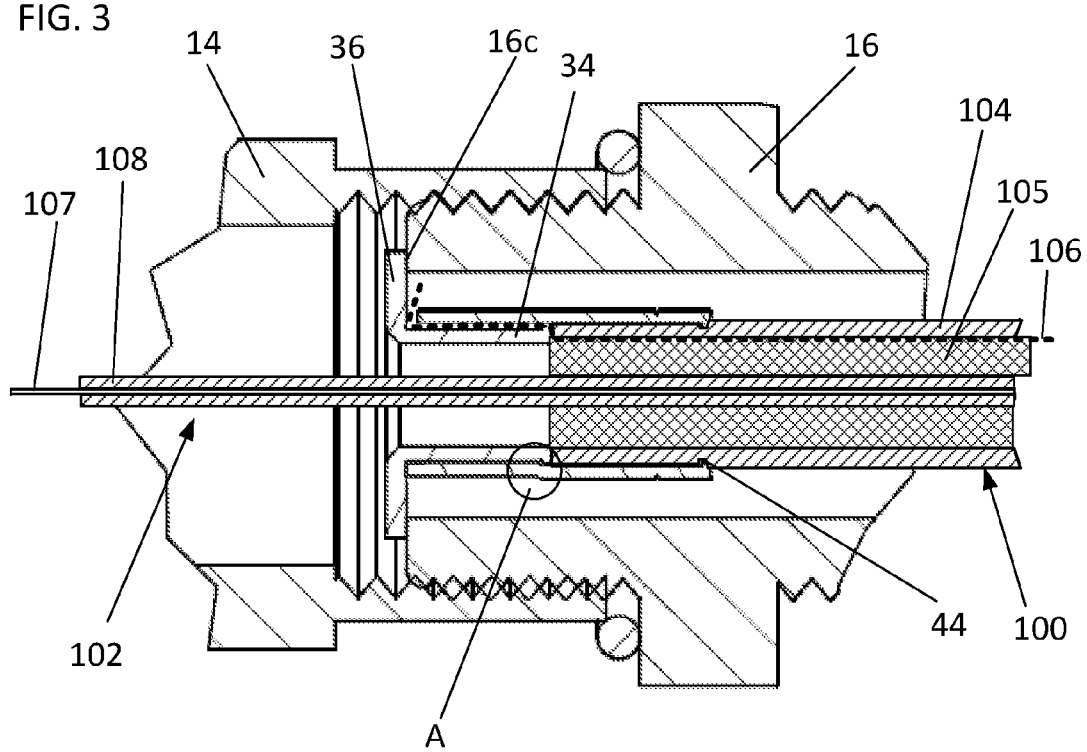
FIG. 3 is a detailed cross-sectional view of a fiber optic cable crimped and retained by a cable retention device according to an embodiment.

The connector 10 is configured for receiving a fiber optic cable 100 therein. The cable 100 may be a simplex cable, a duplex cable, a multi-fiber cable, or any fiber optic cable that is appropriate for the above-listed connectors. To provide a more durable, or rugged connector 10, a cable retention device 30, shown in additional detail in FIG. 2C, may be provided to engage the cable 100 within the connector in a manner as depicted in FIG. 3. With the cable retention device 30 holding the cable 100 within the connector 10, the amount of force needed to pull the cable from the connector is substantially increased. In an embodiment, the amount of force needed to pull the cable from the connector may be increased by at least a factor of about 9 over a connector that does not include such retention device. As such, a simple jostling of the cables, or a casual pull on the cable 100 will not cause the cable to pull away from the connector 10. In an embodiment, the amount of pull force required to pull a cable retained by the retention device 30 from a connector 10 may be at least about 450N (100 lbs).

The cable retention device 30 may include a T-shaped component 32 having a cylindrical post 34 with a radially extending flange 36, and a crimp ring 40 that fits about the post and is crimpable about the post. FIG. 4 shows a perspective view of the T-shaped component 32 and crimp ring 40, and FIG. 5 shows the crimp ring disposed about the cylindrical post 34. The T-shaped component 32 and crimp ring 40 may be formed of a metal, such as aluminum, or nickel plated brass, or any other appropriate types of metals or materials that may be crimped together. In an embodiment, the T-shaped component 32 and crimp ring 40 may be formed of the same metal. Alternatively, each of the T-shaped component 32 and crimp ring 40 may be formed of different metals.

As shown in greater detail in FIGS. 6A-6C, a first end 40a of the crimp ring 40 may include at least one radially inwardly projecting tooth 44. In an embodiment as shown, the teeth 44 may be disposed circumferentially about the first end 40a of the crimp ring 40 and spaced apart from one another. In an alternate embodiment, FIG. 6C provides a cross-sectional view of teeth 44a, having an alternative cross-sectional configuration. In further alternative embodiments, not depicted, the teeth 44 may be spaced axially from the end 40a. Alternatively, teeth 44 may be disposed at the end 40a, as shown, and additional teeth 44 may be provided, for example, in at least one addition ring of such teeth spaced axially away from the teeth at the end. In a further embodiment, teeth 44 may be provided with various different spacings between the teeth, or randomly within the crimp ring 40. In an alternative embodiment, a radially inwardly extending circumferential ring may be provided instead of individual teeth. For a cylindrical crimp ring 40 as shown, the end 40a may include a marking, such as a line or groove 41 that indicates the end of the cylinder that has the teeth, thereby making it easier to install the crimp ring on a cable.

As shown in greater detail in FIGS. 7A-7C, a first end 34a of the post 34 may include at least one radially outwardly projecting element or tooth 46. In an embodiment as shown, the projecting element may be a ridge 46 that may be disposed circumferentially about the first end 34a of the post 34. FIG. 7C provides an alternate embodiment of a ridge 46a having an alternative cross-sectional configuration. While not depicted, the ridge 46 may be disposed spaced axially away from the end 34a, or at least one additional ridge may be provided, for example, spaced axially from the ridge at the end. Alternatively, the ridge may not be continuous along the entire circumference, and in essence, may be configured as circumferentially disposed teeth.

Figure 10:
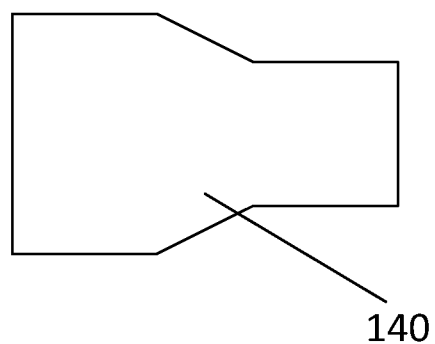
FIG. 10 depicts an alternative configuration of a crimp ring according to an embodiment.

As represented in FIG. 10, instead of a cylindrical crimp ring 40 as shown in FIG. 4, a crimp ring 140 may have alternative configurations to adapt and attach cables of different diameters to the back post. A crimp ring 140 may be a reducing ring wherein a diameter of the cable is greater than a diameter of the back post, or an enlarging ring wherein a diameter of the cable is less than a diameter of the back post.

As represented in FIG. 5, in an embodiment, a fiber optic cable 100 may be inserted through the boot 18, the fitting 16, and the housing 14, and the retention device 30 may be fastened to the cable. As shown in FIGS. 3 and 4, the fiber optic cable 100 may be stripped of a portion of its outer layers 104, 105 to expose fiber strands 102. Fiber strands 102 may include an inner core 107 and a protective sheath 108. In one embodiment, the cable 100 may be inserted at least partially through the crimp ring 40 through the first end 40a, or alternately, the crimp ring may be pushed onto the cable, so that the jacketed cable extends approximately half-way through the crimp ring. In additional embodiments, the jacketed cable 100 may extend through the crimp ring 40 along at least a portion of the length of the crimp ring, such as, for example, about ¼, about ⅓, about ⅔, about ¾, or any fraction between any of the listed values, of the length of the crimp ring. The first end 40a of the crimp ring 40 may be crimped onto the cable 100 to force teeth 44 into the outer jacket 104 of the cable. When crimped in place, the teeth 44 of the crimp ring 40 bite into the outer jacket 104 to provide a retention mechanism for retaining the cable 100 within the crimp ring.

Post 34 may be inserted into the second end 40b of the crimp ring 40, and the second end of the crimp ring may be crimped to the post 34 so that the crimp ring diameter at the second end 40b is reduced to be less than the external diameter at the ridge 46, as depicted by the crimp ring/post configuration shown at A in the bottom half of FIG. 3. The ridge 46 may thereby inhibit removal of the post 34 from the crimp ring, while the teeth 44 inhibit removal of the cable 100 from the crimp ring, thereby retaining the cable with the post 34.

In an alternative embodiment, as depicted by the crimp ring/post configuration in the upper half of FIG. 3, at least one reinforcement member 106 (Kevlar or aramid fibers, for example) of the cable 100 may be crimped between the post 34 and the crimp ring 40 to provide an additional retentive configuration for holding the cable with the post. Similarly, as discussed above, a reduction of the diameter of the end 40b of the crimp ring 40 will inhibit removal of the post from the crimp ring. Additional cable retention may then be provided by the crimp fastened reinforcement member 106, wherein if the cable 100 is disengaged from the teeth 44, the bound reinforcement member may still provide a retentive function for keeping the cable in the connector.

In a further embodiment (not shown, but with reference to FIG. 3), an end portion of the outer layer 105 may extend into the post 34. The layer 105 may, in an embodiment, extend into the post 34, at least to the flange 36. In an alternate embodiment, the outer layer 105 may extend completely through the post 34 and beyond the flange 36.

As shown in FIG. 5, an opening 28 in the housing 14 may be sized and configured for receiving the adapter clip 22 therein. In an embodiment, the flange 36 of the T-shaped component may be configured to fit through the opening 28 as shown in FIGS. 8A and 8B. After attachment of the retention device 30 to the cable 100 (FIG. 5) the cable/retention member assembly may be pulled back through the housing 14 to seat the retention member against the surface 16c of the fitting 16 in the position as shown in cross-section in FIGS. 2C and 3, and in perspective as shown in FIGS. 9A and 9B (cable not shown). So that the flange 36 may pass through the opening 28 yet still be retained by the fitting 16, the flange may have a dimension along the axis 70, for example, that is configured to fit through a narrower dimension of the opening 28, while a dimension along the axis 72, for example, may be larger than the diameter of the passage 17 of the fitting 16. In an alternative embodiment, not shown, if a housing 14 were to be attached to a fitting 16 after the retention device 10 is attached to a cable 100, the flange would not need to fit through the opening 28, and the flange could be circular about its periphery so that the entire flange has a diameter that may be greater than the diameter of the passage 17.

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g.,"a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g.,"a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. An optical fiber cable connector comprising:
a connector housing having a first end and a second end spaced longitudinally from the first end, and the connector housing defining an internal chamber extending between the first end and the second end, the internal chamber having at least one first cross-sectional dimension, and the second end comprising a cable passage for receiving an optical fiber cable therethrough for entry of the optical fiber cable into the internal chamber, the cable passage defining at least one second cross-sectional dimension, the second cross-sectional dimension being less than the first cross-sectional dimension to define an internal shoulder disposed radially about at least a portion of the cable passage;
at least one optical fiber connector disposed within the first end of the connector housing and connected to at least one optical fiber of the optical fiber cable; and
a cable retention element disposed within the internal chamber about the optical fiber cable, the cable retention element comprising:
a retention member comprising:
a cylindrical portion disposed about at least a portion of the optical fiber cable, the cylindrical portion having a first end and a second end spaced from the first end, with the at least one optical fiber extending through the cylindrical portion from the first end through the second end, the cylindrical portion defining a first diameter, and the first end comprising at least one radially outwardly extending tooth defining a second diameter greater than the first diameter; and
a radial flange extending radially from the cylindrical portion adjacent the second end of the cylindrical portion, the radial flange defining a third cross-sectional dimension less than or equal to the first cross-sectional dimension and greater than the second cross-sectional dimension for engaging the shoulder of the cable passage and preventing entry of the radial flange into the cable passage; and
a crimp tube having a first end disposed about and crimped to the optical fiber cable, and a second end spaced from the first end and disposed about and crimped to the cylindrical portion of the first retention member to retain the first retention member with the optical fiber cable, a diameter of the second end of the crimp tube being less than the second diameter defined by the outwardly extending tooth.

2. The optical fiber cable connector of claim 1, wherein the optical fiber cable has an exterior surface, and the first end of the crimp tube comprises at least one radially inwardly extending tooth engaging into the outer surface of the optical fiber cable upon crimping of the first end of the crimp tube to the optical fiber cable.

3. The optical fiber cable connector of claim 2, wherein the crimp tube has an internal surface and the at least one radially inwardly extending tooth comprises an annular ring of a plurality of radially inwardly extending teeth disposed spaced apart from one another adjacent the first end of the crimp tube and engaging into the outer surface of the optical fiber cable upon crimping of the first end of the crimp tube to the optical fiber cable.

4. The optical fiber cable connector of claim 1, wherein:
the cylindrical portion defines a longitudinal direction;
the at least one radially outwardly extending tooth comprises at least one radially outwardly extending annular ring disposed about the cylindrical portion adjacent the first end of the cylindrical portion;
the at least one annular ring having a triangular cross-section in the longitudinal direction; and
the at least one annular ring defining the first diameter at the first end of the cylindrical portion and the second diameter spaced axially from the first end towards the second end of the cylindrical portion.

5. The optical fiber cable connector of claim 4, wherein the first end of the crimp tube comprises an annular ring of a plurality of radially inwardly extending teeth extending into the outer surface of the optical fiber cable upon crimping of the first end of the crimp tube to the optical fiber cable.

6. The optical fiber cable connector of claim 5, wherein the optical fiber cable has at least one cable reinforcement element disposed within the cable, and the at least one cable reinforcement element is crimped between the second end of the crimp tube and the cylindrical portion of the retention member.

7. The optical fiber cable connector of claim 4, wherein:
the radial flange has a cross-sectional shape in a plane transverse to the longitudinal direction;
the first end of the connector housing defines an opening extending into the internal chamber, the opening having a cross-sectional shape configured for receiving the at least one optical fiber connector therein; and
the cross-sectional shape of the radial flange corresponds with the cross-sectional shape of the opening for passage of the cable retention element through the opening.

8. The optical fiber cable connector of claim 7, wherein:
the opening has a rectangular cross-sectional shape defining a fourth cross-sectional dimension and a fifth cross-sectional dimension transverse to the fourth cross-sectional dimension with the fourth cross-sectional dimension being greater than the fifth cross-sectional dimension, and at least one of the fourth cross-sectional dimension and the fifth cross-sectional dimension is greater than the second cross-sectional dimension;
the radial flange defines a sixth cross-sectional dimension transverse to the third cross-sectional dimension, the sixth cross-section dimension being less than the third cross-sectional dimension; and
the sixth cross-sectional dimension is less than the fifth cross-sectional dimension, and the third cross-sectional dimension is less than the fourth cross-sectional dimension for passage of the cable retention element through the opening.

9. The optical fiber cable connector of claim 7, wherein:
the connector housing comprises a cylindrical body defining the internal chamber therein, and a tailpiece comprising the cable passage; and
the tailpiece comprises a first end for being disposed within the cylindrical body, the first end of the tailpiece comprising the internal shoulder, and the tailpiece being engageable with and disengageable from the cylindrical body.

10. A cable retention element for retaining an optical fiber cable with a fiber optic cable connector, the cable retention element comprising:
a first retention member comprising:
a cylindrical portion for being disposed about at least a portion of an optical fiber cable, the cylindrical portion having a first end, a second end spaced from the first end, and a central passage extending from the first end to the second end, the cylindrical portion defining a first diameter and the first end comprising at least one radially outwardly extending tooth defining a second diameter greater than the first diameter;

a radial flange extending radially outwardly from the cylindrical portion adjacent the second end of the cylindrical portion, the radial flange being configured for engaging with a portion of a fiber optic cable connector; and a crimp tube having a first end for being disposed about and crimped to the optical fiber cable, and a second end spaced from the first end for being disposed about and crimped to at least the first end of the cylindrical portion of the first retention member to retain the first retention member with the optical fiber cable, an internal diameter of the second end of the crimp tube being less than the second diameter defined by the outwardly extending tooth.

11. The cable retention element of claim 10, wherein the first end of the crimp tube comprises at least one radially inwardly extending tooth configured for engaging into an outer surface of an optical fiber cable upon placement of the first end of the crimp tube about the optical fiber cable.

12. The cable retention element of claim 11, wherein the at least one radially inwardly extending tooth is configured for being pressed into the outer surface of an optical fiber cable upon crimping of the first end of the crimp tube to the optical fiber cable.

13. The cable retention element of claim 12, wherein the crimp tube has an internal surface and the at least one radially inwardly extending tooth comprises a plurality of radially inwardly extending teeth disposed spaced apart from one another about the internal surface.

14. The cable retention element of claim 13, wherein the plurality of radially inwardly extending teeth comprise an annular ring of teeth disposed adjacent the first end of the crimp tube.

15. The cable retention element of claim 10, wherein:
the second end of the crimp tube is configured to fit axially over the first end of the cylindrical portion, and the second end of the crimp tube is crimpable about the first end of the cylindrical portion so as to reduce the diameter of the second end of the crimp tube to less than the second diameter.

16. The cable retention element of claim 15, wherein the at least one radially outwardly extending tooth comprises at least one radially outwardly extending annular ring defining the second diameter greater than the first diameter.

17. The cable retention element of claim 16, wherein the cylindrical portion defines a longitudinal direction, the at least one annular ring has a triangular cross-section in the longitudinal direction, and the annular ring defines the first diameter at the first end of the cylindrical portion and the second diameter spaced axially from the first end towards the second end of the cylindrical portion.

18. The cable retention element of claim 16, wherein the first end of the crimp tube comprises an annular ring of a plurality of radially inwardly extending teeth configured for being pressed into the outer surface of an optical fiber cable upon crimping of the first end of the crimp tube to the optical fiber cable.

* * * * *